US012791820B2

(12) United States Patent
Lee

(10) Patent No.: US 12,791,820 B2
(45) Date of Patent: Nov. 10, 2026

(54) CAMERA MODULE

(71) Applicant: SAMSUNG ELECTRO-MECHANICS CO., LTD., Suwon-si (KR)

(72) Inventor: Jihae Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 286 days.

(21) Appl. No.: 18/537,187

(22) Filed: Dec. 12, 2023

(65) Prior Publication Data

US 2024/0319469 A1 Sep. 26, 2024

(30) Foreign Application Priority Data

Mar. 23, 2023 (KR) ........................ 10-2023-0038071

(51) Int. Cl.
*G02B 7/02* (2021.01)

(52) U.S. Cl.
CPC .................................... *G02B 7/021* (2013.01)

(58) Field of Classification Search
None
See application file for complete search history.

(56) References Cited

U.S. PATENT DOCUMENTS

2015/0077840 A1* 3/2015 Kim ..................... H02K 41/031 359/355
2015/0138424 A1 5/2015 Dobashi
2017/0214831 A1 7/2017 Ha et al.

FOREIGN PATENT DOCUMENTS

JP 2006-310379 A 11/2006
JP 2015-99262 A 5/2015
KR 10-2015-0051683 A 5/2015
KR 10-2017-0090187 A 8/2017
KR 10-2023-0029128 A 3/2023
KR 20230029128 A * 3/2023 ............. H04N 25/61

OTHER PUBLICATIONS

Korean Notice of Allowance issued on Apr. 1, 2025, in corresponding Korean Patent Application No. 10-2023-0038071. (1page in English, 2pages in Korean).
Korean Office Action issued on Aug. 12, 2024, in counterpart Korean Patent Application No. 10-2023-0038071 (4 pages in English, 4 pages in Korean).

* cited by examiner

*Primary Examiner* — Shan Liu
(74) *Attorney, Agent, or Firm* — NSIP Law

(57) ABSTRACT

A camera module includes a lens barrel; a housing accommodating the lens barrel; an image sensor disposed, below the lens barrel, on a substrate in an optical axis direction of the lens barrel; and a sub-housing disposed between the lens barrel and the substrate, the sub-housing comprising an opening, a frame portion disposed on an outer portion of the sub-housing to surround the opening, and a slant portion disposed on an upper side of the frame portion. A height of the slant portion increases towards a direction of the opening in the optical axis direction.

18 Claims, 7 Drawing Sheets

CAMERA MODULE

CROSS-REFERENCE TO RELATED APPLICATIONS

This application claims the benefit under 35 USC § 119(a) of Korean Patent Application No. 10-2023-0038071, filed on Mar. 23, 2023, in the Korean Intellectual Property Office, the entire disclosure of which is incorporated herein by reference for all purposes.

BACKGROUND

1. Field

The following disclosure relates to a camera module.

2. Description of the Background

As information communication and semiconductor techniques rapidly develop, supply and use of electronic devices are steeply increasing. Electronic devices do not merely remain traditional but converge various functions and provide converged ones.

Portable electronic devices, such as smartphones, tablet PCs, or laptop computers, now include cameras with an autofocus (AF) function, an image stabilizer (IS) function, and a zoom function.

As electronic devices with camera modules become slimmer, the camera module also becomes smaller, limiting the space for additional structures to prevent a flare phenomenon generated when light passing through a lens is input again to the lens and then diffused and reflected.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel; a housing accommodating the lens barrel; an image sensor disposed, below the lens barrel, on a substrate in an optical axis direction of the lens barrel; and a sub-housing disposed between the lens barrel and the substrate, the sub-housing comprising an opening, a frame portion disposed on an outer portion of the sub-housing to surround the opening, and a slant portion disposed on an upper side of the frame portion. A height of the slant portion increases towards a direction of the opening in the optical axis direction.

The slant portion may be disposed in an internal edge region of the frame portion.

The slant portion may be an indented portion on an upper side of the frame portion.

The slant portion may extend along an internal edge of the frame portion.

The sub-housing may further include a mounting portion disposed between the opening and the frame portion, and a filter portion received in the mounting portion.

The height of the slant portion may be higher than a height of the mounting portion in the optical axis direction.

Each of the mounting portion, the slant portion, and the frame portion may form a step in the optical-axis direction that are sequentially connected.

The height of the slant portion may be lower than a height of the frame portion in the optical axis direction.

The slant portion may be disposed in an internal edge region of the frame portion.

The slant portion may include a plurality of slant portions. At least one of the slant portions may be disposed in a first edge region of the frame portion, and another of the slant portions may be disposed in a second edge region facing the first edge region.

The slant portion may extend along an internal edge of the frame portion.

A length of the slant portion may be shorter than a length of the frame portion in a direction perpendicular to the optical-axis direction and parallel to one edge of the sub-housing.

In another general aspect, a camera module includes a lens barrel; a housing accommodating the lens barrel; an image sensor disposed, below the lens barrel, on a substrate in an optical axis direction of the lens barrel; and a sub-housing comprising a frame portion enclosing an opening and a slant portion disposed on a side of the frame portion. The sub-housing is disposed between the lens barrel and the substrate, and a thickness of the slant portion increases towards a direction of the opening.

Another slant portion may be disposed on another side of the frame portion.

The slant portion may be disposed on an inner edge of the frame portion.

A length of the slant portion may be less than a length of the opening enclosed by the frame portion.

The sub-housing may further include a mounting portion disposed between the opening and the frame portion, and a filter portion received in the mounting portion. Each of the mounting portion, the slant portion, and the frame portion may form a step descending towards the opening enclosed by the frame portion.

Other features and aspects will be apparent from the following detailed description, the drawings, and the claims.

Figure 1:
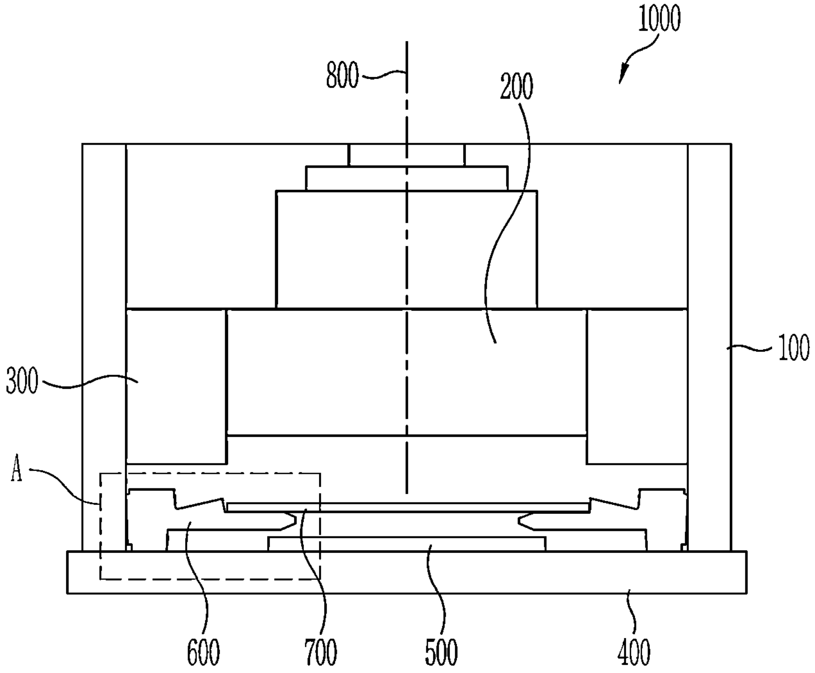
FIG. 1 shows a cross-sectional view of a camera module according to an embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

The phrase "in a plan view" or "on a plane" means viewing a target portion from the top, and the phrase "in a cross-sectional view" or "on a cross-section" means viewing a cross-section formed by perpendicularly cutting a target portion from the side.

Figure 2:
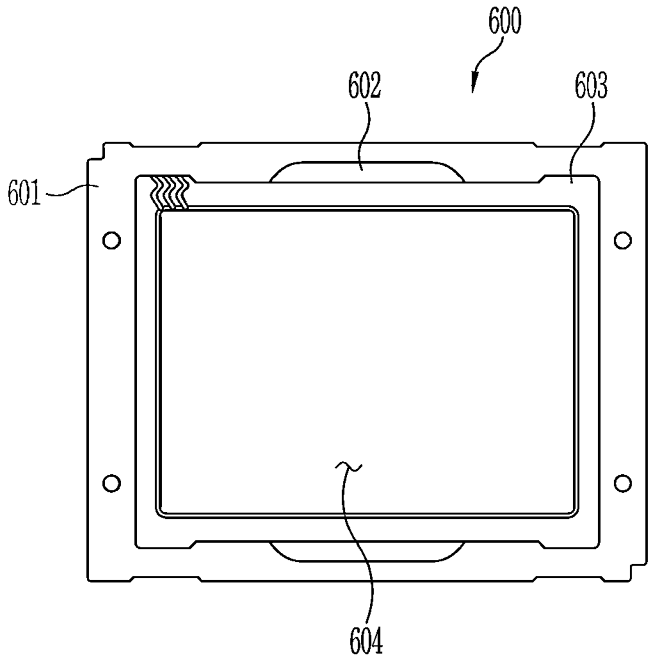
FIG. 2 shows a top plan view of part of a camera module according to an embodiment.
Figure 3:
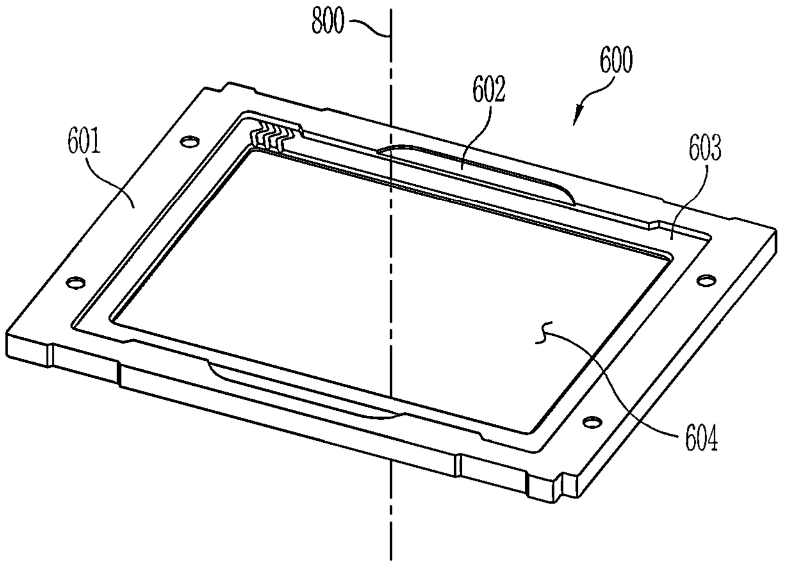
FIG. 3 shows a perspective view of part of a camera module according to an embodiment.
Figure 4:
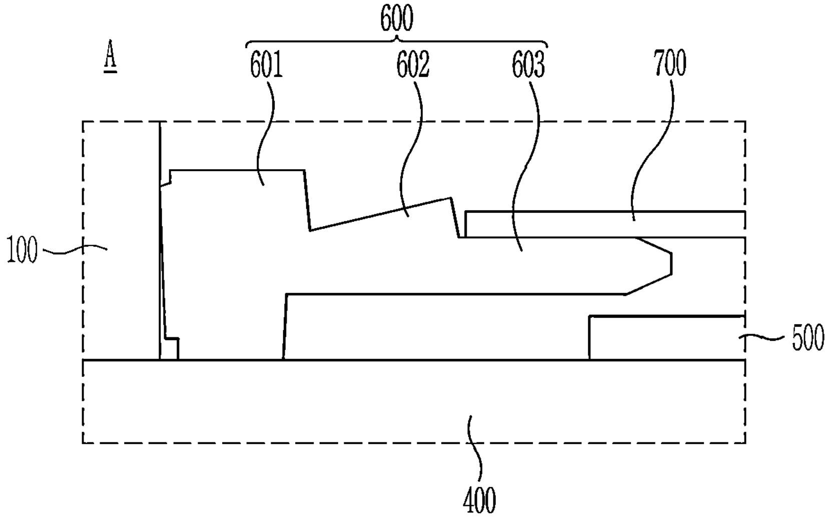
FIG. 4 shows an enlarged cross-sectional view of a portion A of a camera module according to an embodiment.

""A camera module 1000, according to an embodiment, will now be described with reference to FIG. 1 to FIG. 4. FIG. 1 shows a cross-sectional view of a camera module according to an embodiment, FIG. 2 shows a top plan view of part of a camera module according to an embodiment, FIG. 3 shows a perspective view of part of a camera module according to an embodiment, and FIG. 4 shows an enlarged cross-sectional view of a portion A of a camera module according to an embodiment.

Referring to FIG. 1, the camera module 1000 may include a housing 100, a lens barrel 200, a lens driver 300, a substrate 400, an image sensor 500, a sub-housing 600, and a filter portion 700.

The housing 100 may receive the lens barrel 200 and the lens driver 300. The housing 100 may have a polyhedral shape with a quadrangular cross-section and a predetermined height. However, the shape of the housing 100 is not limited to the polyhedral shape with a quadrangular cross-section.

The lens barrel 200 may include a plurality of lenses disposed in a direction of an optical axis 800. The lens barrel 200 may move in the direction of the optical axis 800 while received into the housing 100 by a driving force of the lens driver 300.

The lens driver 300 may provide a driving force for driving the lens barrel 200. For example, the lens driver 300 may drive the lens barrel 200 in the direction of the optical axis 800 according to an electromagnetic force. As the lens barrel 200 moves in the direction of the optical axis 800, the focus of the lens barrel 200 may be adjusted.

The substrate 400 may be electrically connected to the lens driver 300. The substrate 400 may be a flexible printed circuit board (FPCB).

The image sensor 500 may be installed on the substrate 400. The image sensor 500 may be disposed below the lens barrel 200 in the direction of the optical axis 800.

A sub-housing 600 and a filter portion 700 installed in the sub-housing 600 may be disposed between the substrate 400 and the lens barrel 200 in which the image sensor 500 is installed. The filter portion 700 may be disposed in the sub-housing 600. The filter portion 700 may block light with a specific wavelength. For example, the filter portion 700 may block infrared rays. However, the light blocked by the filter portion 700 is limited to the infrared rays.

As described, the housing 100 and the sub-housing 600 may define an internal space for receiving the lens barrel 200, the lens driver 300, or the image sensor 500.

According to the present embodiment, a sub-housing 600 of the camera module 1000 will now be described with reference to FIG. 2 to FIG. 4 together with FIG. 1.

The sub-housing 600 may have a quadrangular planar shape. The sub-housing 600 may include an opening 604 in a center, and the image sensor 500 may be disposed in the opening 604 of the sub-housing 600. The opening 604 of the sub-housing 600 may have a quadrangular planar shape.

The sub-housing 600 may have a step in the direction of the optical axis 800, and may include a frame portion 601, a slant portion 602, and a mounting portion 603 sequentially connected to each other.

The mounting portion 603 may surround the opening 604 for at least partly overlapping the image sensor 500. The mounting portion 603 may be disposed between the opening 604 and the frame portion 601. A filter portion 700 may be installed in the mounting portion 603. The mounting portion 603 may be higher than the slant portion 602 and the frame portion 601 in the direction of the optical axis 800. The mounting portion 603 may have a quadrangular planar shape, and is not limited thereto.

The frame portion 601 may extend to an external edge of the sub-housing 600 from the mounting portion 603. The frame portion 601 may be disposed on an outer portion of the sub-housing 600 surrounding the opening 604. The frame portion 601 may surround the mounting portion 603. The frame portion 601 may be higher than the slant portion 602 in the direction of the optical axis 800. The frame portion 601 may have a quadrangular planar shape, and is not limited thereto.

The slant portion 602 may be disposed in an internal edge region of the frame portion 601. For example, the slant portion 602 may include a plurality of slant portions, and the respective slant portions 602 may be disposed in the facing internal edge region of the frame portion 601. For a detailed example, at least one of the slant portions 602 may be disposed in a first edge region of the frame portion 601, and others thereof may be disposed in a second edge region facing the first edge region of the frame portion 601.

The slant portion 602 may extend along the internal edge of the frame portion 601. The slant portion 602 may be provided when part of an upper side of the frame portion 601 is dented. The slant portion 602 may be dented in an external edge direction of the frame portion 601. The slant portion 602 may be shorter than the frame portion 601 in a direction that is perpendicular to the direction of the optical axis 800 and is parallel to one edge of the sub-housing 100.

The slant portion 602 may be lower than the frame portion 601 and may be higher than the mounting portion 603 in the direction of the optical axis 800. The slant portion 602 may have a portion of which the height increases in a direction facing toward the internal edge from the external edge of the sub-housing 100. In other words, the slant portion 602 may be the highest on a portion disposed near an outer edge of the mounting portion 603, and may become gradually lower when approaching the external edge of the frame portion 601. The height of the slant portion increases towards a direction of the opening in the optical axis direction.

Figure 5:
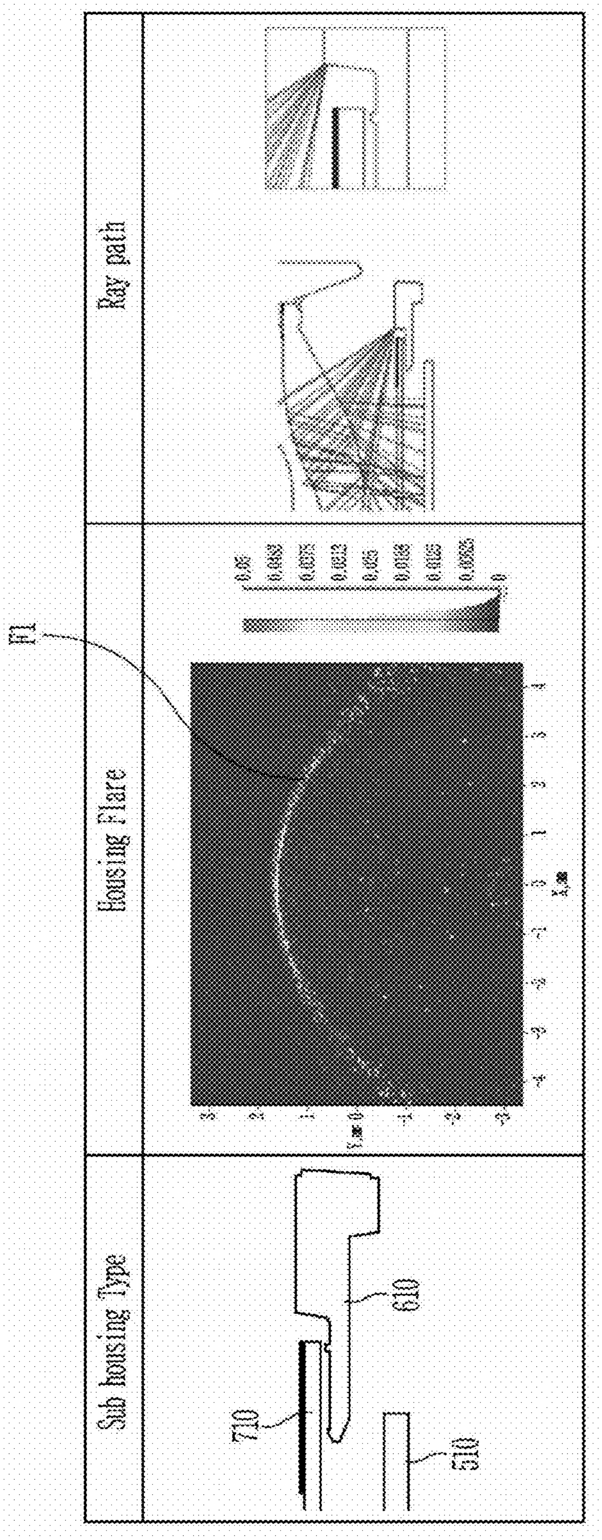
FIG. 5 shows a simulation result of a sub-housing according to a comparative example 1.

A simulation result for respective sub-housing types will now be described with reference to FIG. 5 to FIG. 8. FIG. 5 shows a simulation result of a sub-housing according to a comparative example 1, FIG. 6 shows a simulation result of a sub-housing according to a comparative example 2, and FIG. 7 shows a simulation result of a sub-housing according to an embodiment.

Images displayed by the light that is input to the camera module from the outside and paths for the input light to be reflected or refracted and move are simulated for respective sub-housing types. The images displayed by the light input to the camera module are shown by illuminance.

As shown in FIG. 5, regarding the camera module, according to a comparative example 1, a sub-housing 610 includes no slant portion 602. Therefore, the light reflected to the lens barrel 200 from the upper surface of the sub-housing 610 may be additionally reflected to the image sensor 510 from the surface of the lens barrel 200. It is found that a flare phenomenon is generated in the camera module, and a flare image F1 is clearly manifested on a screen.

Figure 6:
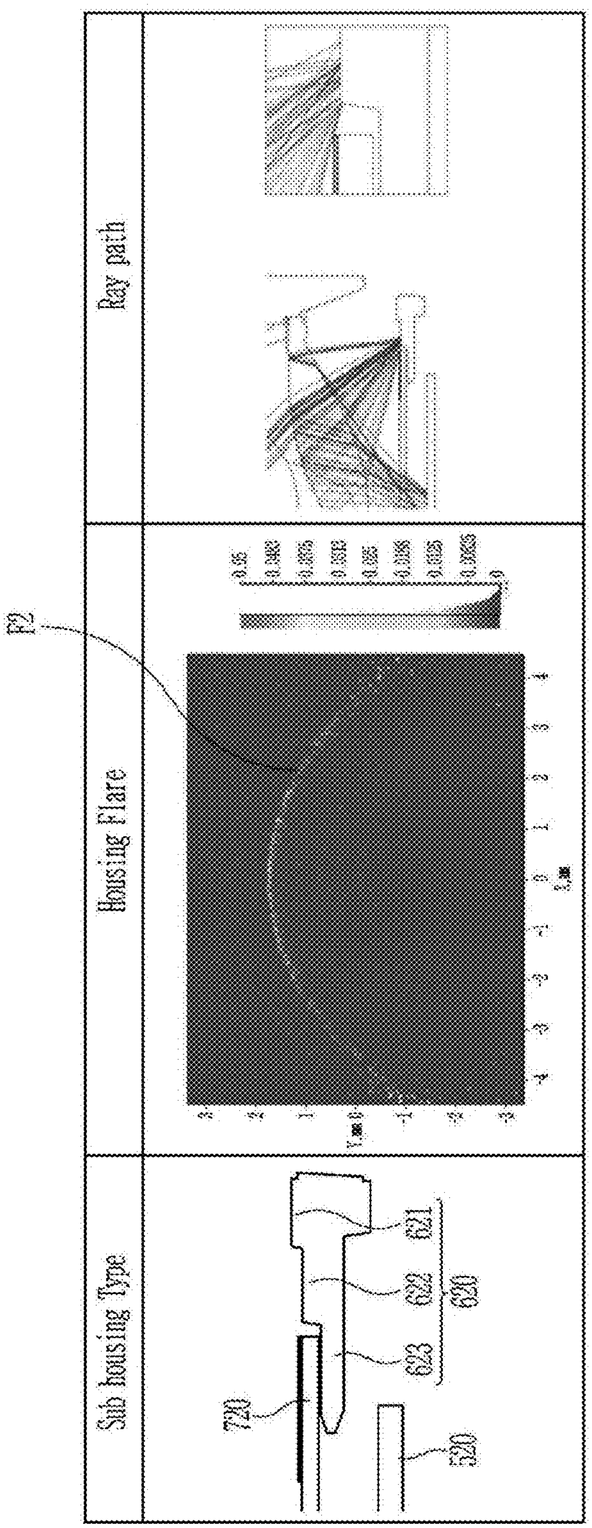
FIG. 6 shows a simulation result of a sub-housing according to a comparative example 2.
Figure 7:
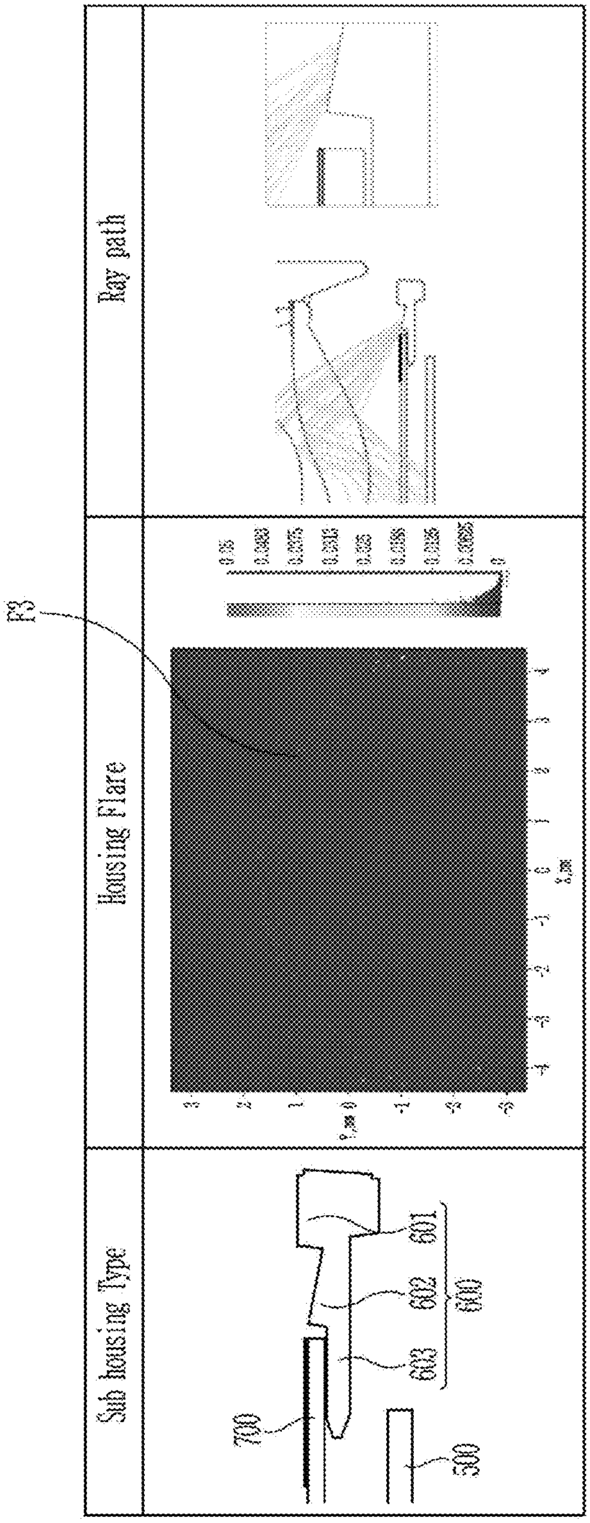
FIG. 7 shows a simulation result of a sub-housing according to an embodiment.

As shown in FIG. 6, regarding the camera module, according to a comparative example 2, a sub-housing 620 includes a planar portion 622 having no slant between a frame portion 621 and a mounting portion 623. Hence, the light reflected to the lens barrel 200 from the upper surface of the sub-housing 620 may be additionally reflected to the image sensor 520 from the surface of the lens barrel 200. It Is found that a flare phenomenon is generated in the camera module, and a flare image F2 is clearly manifested on a screen.

As described with reference to FIG. 5 and FIG. 6, when the flare phenomenon is generated, the size of the camera module may be reduced, the thickness of the lens barrel 200 may be reduced, and the space for disposing an additional structure for preventing the flare phenomenon may be limited. As a result, it may be difficult to prevent the flare phenomenon through the additional structure.

However, as shown in FIG. 7, regarding the camera module according to the present embodiment, the sub-housing 600 includes a slant portion 602, of which the height increases in the direction going toward the internal edge from the external edge of the sub-housing 100, in the optical axis direction. Therefore, compared to the structure according to the comparative example 1 and the comparative example 2 described with reference to FIG. 5 and FIG. 6, it is found that, as the light input to the sub-housing 600 may be reflected to the outer portion of the sub-housing 600 from the surface of the slant portion 602, a flare image F3 seldom appears. Accordingly, it is found that, while no additional structure is disposed between the lens barrel 200 and the image sensor 500, the light reflected at the surface of the lens barrel 200 and undesirably input to the image sensor 500 is relatively reduced, thus preventing the flare phenomenon.

The present disclosure may provide a camera module for preventing a flare phenomenon generated when light passing through a lens is input again to the lens and is then diffused and reflected.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A camera module comprising:

a lens barrel;

a housing accommodating the lens barrel;

an image sensor disposed, below the lens barrel, on a substrate in an optical axis direction of the lens barrel; and a sub-housing disposed between the lens barrel and the substrate, the sub-housing comprising:

an opening; and a frame portion disposed on an outer portion of the sub-housing to surround the opening and comprising a slant portion disposed on an upper side of the frame portion, wherein the slant portion extends along and formed at only a portion of an internal linear edge of the frame portion facing the opening, wherein the slant portion is configured to reflect light input to the sub-housing outwardly to reduce flare reaching the image sensor, and wherein a height of the slant portion increases towards a direction of the opening in the optical axis direction.

2. The camera module of claim 1, wherein the sub-housing further includes a mounting portion disposed between the opening and the frame portion, and a filter portion is received in the mounting portion.

3. The camera module of claim 2, wherein the height of the slant portion is higher than a height of the mounting portion in the optical axis direction.

4. The camera module of claim 2, wherein each of the mounting portion, the slant portion, and the frame portion forms a step in the optical-axis direction that are sequentially connected.

5. The camera module of claim 2, wherein the slant portion is disposed in an internal edge region of the frame portion.

6. The camera module of claim 5, wherein the slant portion includes a plurality of slant portions, at least one of the slant portions is disposed in a first edge region of the frame portion, and another of the slant portions is disposed in a second edge region facing the first edge region.

7. The camera module of claim 1, wherein the height of the slant portion is lower than a height of the frame portion in the optical axis direction.

8. The camera module of claim 1, wherein a length of the slant portion is shorter than a length of the frame portion in a direction that is perpendicular to the optical-axis direction and parallel to one edge of the sub-housing.

9. The camera module of claim 1, wherein the slant portion is an indented portion on an upper side of the frame portion.

10. The camera module of claim 1, wherein the sub-housing further includes a mounting portion disposed between the opening and the frame portion, and wherein the slant portion has a highest point disposed near an outer edge of the mounting portion and a lowest point at the internal linear edge of the frame portion.

11. The camera module of claim 1, wherein the slant portion has a surface that is angled relative to the optical axis direction such that the surface slopes downward from the mounting portion toward an external edge of the sub-housing.

12. A camera module comprising:

a lens barrel;

a housing accommodating the lens barrel;

an image sensor disposed, below the lens barrel, on a substrate in an optical axis direction of the lens barrel; and a sub-housing comprising a frame portion enclosing an opening and a slant portion disposed on a side of the frame portion, wherein the slant portion extends along and formed at only a portion of an internal linear edge of the frame portion, wherein the slant portion is configured to reflect light input to the sub-housing outwardly to reduce flare reaching the image sensor, and wherein the sub-housing is disposed between the lens barrel and the substrate, a thickness of the slant portion increases towards a direction of the opening.

13. The camera module of claim 12, wherein another slant portion is disposed on another side of the frame portion.

14. The camera module of claim 12, wherein a length of the slant portion is less than a length of the opening enclosed by the frame portion.

15. The camera module of claim 12, wherein the sub-housing further includes a mounting portion disposed between the opening and the frame portion, and a filter portion is received in the mounting portion.

16. The camera module of claim 15, wherein each of the mounting portion, the slant portion, and the frame portion forms a step descending towards the opening enclosed by the frame portion.

17. The camera module of claim 12, wherein the slant portion has a maximum thickness disposed nearest the opening and gradually decreases in thickness toward an outer edge of the sub-housing.

18. The camera module of claim 12, wherein the slant portion has a surface that is angled relative to the optical axis direction.

* * * * *